Patented May 8, 1928.

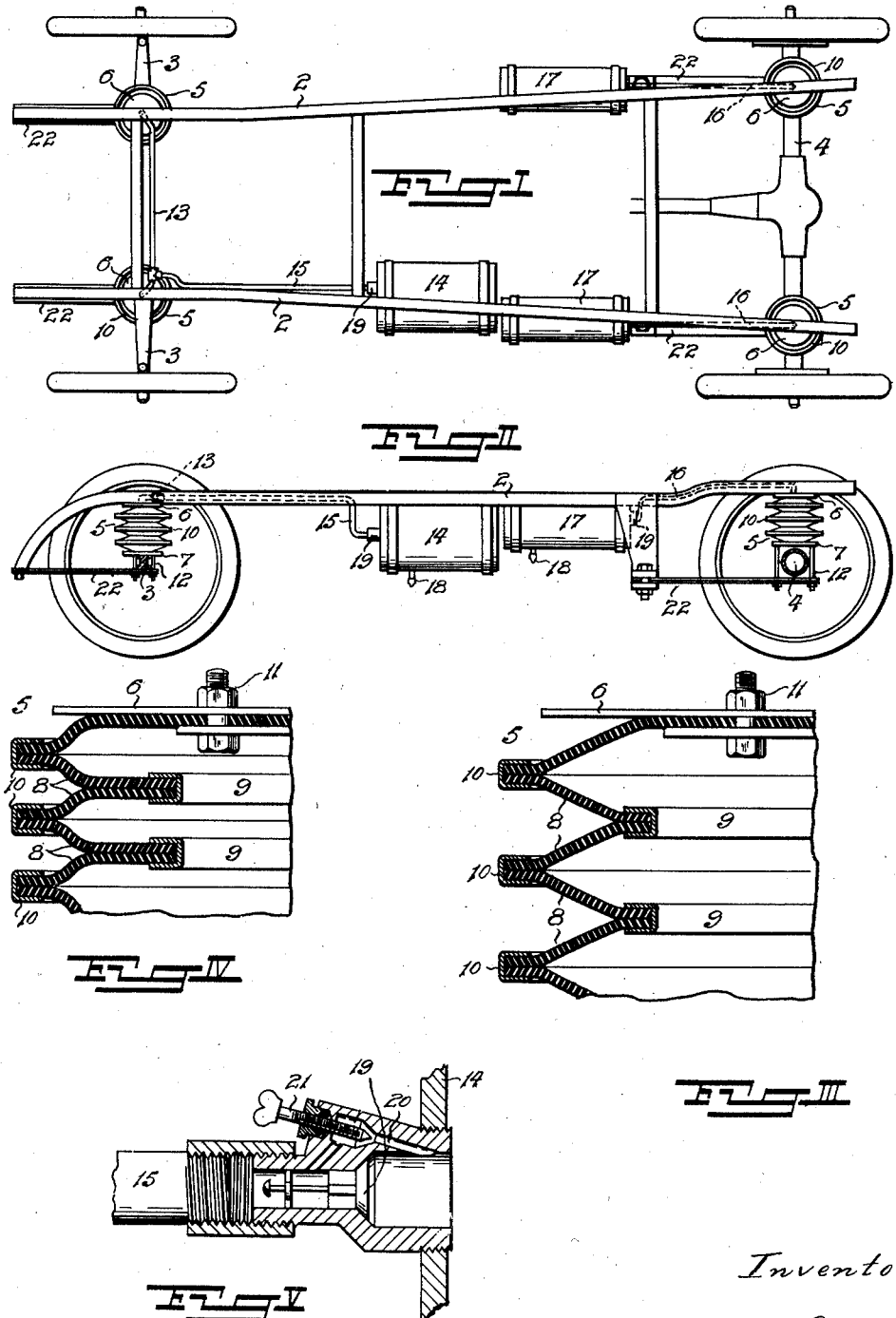

1,668,669

UNITED STATES PATENT OFFICE.

CHARLES WILLIAM CALDWELL, OF BEREA, TRANSVAAL, SOUTH AFRICA.

SPRING SUSPENSION FOR VEHICLES.

Application filed February 5, 1926. Serial No. 86,291.

The present invention refers to pneumatic spring suspensions for vehicles.

One purpose of the invention is to provide a pneumatic spring specially adapted to resist bursting and therefore reliable for use on a vehicle. Another purpose is to provide a short pneumatic spring having the yielding properties of a much longer one. The invention further aims to provide the three-point support effect on a vehicle and to control the rebound of the springs.

In the accompanying drawings:—

Fig. I is a plan view of a vehicle fitted with the invention, the body being removed.

Fig. II is a side elevation.

Fig. III is an enlarged fragmental section of a pneumatic spring in extended condition.

Fig. IV shows the same compressed.

Fig. V is an enlarged sectional view of a rebound control valve.

2 indicates the frame of the vehicle. The front axle is indicated by 3 and the rear axle by 4. The pneumatic springs are indicated by 5, one being shown adjacent to each of the four wheels.

The construction of the pneumatic spring is shown in the cross sectional view Figs. III and IV. It comprises the two end plates 6, 7 between which is the extensible bellows structure comprising leaves 8, and specially constructed to resist internal pressure. To this end its component leaves 8 are made of flexible but comparatively inextensible material such as leather or rubber re-inforced with fabric. They are also substantially flat, that is, not shaped to conical form but assuming a flat conical form, when opened out, by reason of their flexibility. It is also preferred to make the leaves of considerable radial width, as shown, relatively to the diameter of the bellows, and few in number. The adjoining inner edges of each alternate pair of leaves are re-inforced by stiff metal rings 9; and the outer edges are preferably re-inforced by similar rings 10.

Fig. III shows the bellows extended before being subjected to internal air pressure. Fig. IV shows the shape when the bellows is compressed and subjected to internal pressure; at which time the leaves come together towards the centre and the flexing is confined to their outer edges. The leaves are in all cases virtually parallel to the outward pressure of the air so that they cannot be blown outwards. The end plates are provided with suitable means for securing the pneumatic springs in place, such as the bolts 11 for fixing one end to the vehicle frame and the clips 12 for securing the other end to the axle.

It is preferred to put the two front pneumatic springs in free communication with one another by a connecting pipe 13. With this arrangement the compression or extension of one spring of the pair tends to cause the converse extension or shortening of the other spring of the pair. The front axle is thus permitted to tilt in a vertical plane about its centre point with considerable freedom, giving the effect of one-point suspension at the front end of the frame.

The rear pneumatic springs on the other hand are preferably arranged as independent units in order to give desirable stability to the vehicle.

Undue increase of resistance, as the pneumatic springs are compressed, is avoided by putting the air within the springs in communication with stored compressed air. In the arrangement shown the two front springs are connected with an air reservoir 14 by an extension 15 of the pipe 13; while each rear spring 5 is connected by a pipe 16 to its separate reservoir 17. The air in the several reservoirs is maintained at the normal pressure required in the springs and such normal pressure may be varied to suit alterations in the loading of the vehicle, by forcing in more air under pressure or by allowing air to escape. Connection for this purpose may be made by the usual type of tire valve 18.

For checking the rebound of the springs there is provided at each reservoir a valve 19 opening towards the reservoir, but closing automatically in the reverse direction. When the valve is seated a restricted flow of air is permitted through the orifice 20. The effect is that the pneumatic springs yield readily upon meeting an obstruction on the road but are prevented from throwing up the body in recovering their normal form. The outflow through the orifice is regulated by an adjustable valve 21.

The pneumatic springs being designed only to control up and down movement between the axles and the frame, provision is made for also connecting the axles and frame as required to maintain them in their respective positions, while permitting the axles to lift and tilt vertically relatively to the frame. Such attachment is conveniently effected by leaf springs 22 of the usual construction, wide enough to resist lateral bending but sufficiently thin not to take the weight of the frame and body to any considerable extent.

I claim:

1. A spring suspension system for vehicles comprising pneumatic springs, compressed air storage means in communication with the springs, and valve means permitting free flow of air from the springs to the storage means while limiting the flow of air from the storage means to the springs.

2. A spring suspension system for vehicles comprising four pneumatic springs, means placing two of said springs in free communication with one another, compressed air reservoirs, means placing the two freely connected springs jointly in communication with a reservoir, and means placing the other two springs individually in connection with other reservoirs.

3. A spring suspension system for vehicles comprising four pneumatic springs, means placing two of said springs in free communication with one another, compressed air reservoirs, means placing the two freely connected springs jointly in communication with a reservoir, means placing the other two springes individually in connection with other reservoirs, and means controlling said several connections to restrict the flow of air from the reservoir to the spring.

4. In a vehicle, the combination of a frame, a front axle, two pneumatic springs positioned respectively near to the ends of said axle, and other pneumatic springs separate from and located in rear of the front springs; all the springs conjointly supporting the frame, and the front springs being freely connected together but devoid of connection with the rear springs.

5. In a vehicle, the combination of a frame, a front axle, two pneumatic springs positioned respectively near to the ends of the axle and supporting the frame, a reservoir, and piping exclusively connecting said springs to each other and to the reservoir.

6. In a vehicle, the combination of a frame, a front axle, a rear axle, and four pneumatic springs positioned respectively near to the several ends of said axles and conjointly supporting the frame; the two front axle springs being connected to one another, and each rear axle spring being devoid of connection with any other spring.

7. In a vehicle, the combination of a frame, a front axle, a rear axle, four penumatic springs positioned respectively near to the several ends of said axles and conjointly supporting the frame, a front reservoir for the front axle springs, connections exclusively connecting the front axle springs to each other and to their reservoir, and a pair of rear reservoirs independent of each other and of the front reservoir and each exclusively connected to a single rear axle spring.

In testimony whereof I affix my signature.

CHARLES WILLIAM CALDWELL.